United States Patent [19]
Komiyama et al.

[11] Patent Number: 4,676,453
[45] Date of Patent: Jun. 30, 1987

[54] MAGNETIC TAPE CASSETTE

[75] Inventors: Choji Komiyama; Kengo Oishi, both of Kanagawa, Japan

[73] Assignee: Fuji Photo Film Co., Ltd., Kanagawa, Japan

[21] Appl. No.: 768,610

[22] Filed: Aug. 23, 1985

[30] Foreign Application Priority Data

Sep. 3, 1984 [JP] Japan .............................. 59-132688[U]
Sep. 3, 1984 [JP] Japan .............................. 59-144224[U]

[51] Int. Cl.⁴ ..................... G11B 23/087; G11B 23/04; G11B 23/08
[52] U.S. Cl. ................................... 242/199; 242/198; 242/200; 360/96.1; 360/96.5
[58] Field of Search ............................... 242/197–200, 242/194; 360/96.1, 96.5, 132

[56] References Cited
U.S. PATENT DOCUMENTS

| | | | |
|---|---|---|---|
| 4,214,719 | 7/1980 | Kato | 242/198 |
| 4,225,100 | 9/1980 | Sugawara | 242/198 |
| 4,496,119 | 1/1985 | Sieben | 242/198 |
| 4,576,345 | 3/1986 | Koken et al. | 242/198 |

*Primary Examiner*—John Petrakes
*Attorney, Agent, or Firm*—Sughrue, Mion, Zinn, Macpeak, and Seas

[57] ABSTRACT

A magnetic tape cassette of a type particularly useful for high density digital audio recording wherein the tape is positively protected from dust and other contamination. The cassette includes a pair of hubs on which the magnetic tape is wound, and a locking member for locking the hubs. An opening is provided through which the tape can be extracted for playing. A swingable guard panel is provided which closes the front part of the opening when the cassette is not in use, and a slidable slide guard closes the lower part of the opening. The locking member has locking parts engaged with annular parts formed on the hubs to prevent rotation of the hubs, the locking member being slidable in a direction forwardly and backwardly of the cassette. The slide guard is in the form of a plate slidable on the outer surface of the bottom of the cassette forwardly and backwardly. A compound spring is provided which has a fulcrum part locked to a boss formed in the cassette case and two arms extending from the fulcrum part. One of the two arms urges the locking member toward the rear end of the cassette, while the other arm urges the slide guide towards the front end of the cassette.

9 Claims, 7 Drawing Figures

MAGNETIC TAPE CASSETTE

BACKGROUND OF THE INVENTION

The present invention relates to magnetic tape cassettes, and more particularly to an audio compact cassette which is the same in size or smaller than a standard "Phillips"-type compact cassette.

Recently, cassette tape recorders have been reduced both in size and in weight, and accordingly it is desirable that magnetic tape cassettes used for such recorders also be miniaturized. Therefore, there has been a strong demand for the provision of small magnetic tape cassettes which are suitable for high-quality and high-density recording and reproducing operations.

Magnetic tape cassettes meeting this requirement are often recorded on using a digital recording system such as the PCM (pulse code modulation) system whereby recording and reproducing operations are carried out with input signals converted into pulse signals. In such a system, the recording frequency bandwidth must be about five times that which a conventional audio tape is capable of. Therefore, video tape cassettes have been extensively employed for digital recording.

Video tape cassettes (except for special cases) are employed with a recording/reproducing apparatus using a rotary head system. These video tape cassettes have guard panels which close openings in the front parts of the cassettes when the cassettes are not in use, and which are swingable upwardly to gain access to the tape for recording/reproducing. That is, because in a digital recording/reproducing system, recording is carried out at a high density and using a wide bandwidth, to maintain its suitability for such use, the magnetic tape cassette must have provisions for preventing the entrance of dust and for protecting the magnetic tape from damage.

The technical concept of the invention is particularly applied to a very small magnetic tape cassette which, as in the case of a video tape cassette, employs a relatively wide bandwidth recording and reproducing system, and which is applicable to audio devices, and which is the same in size or smaller than the conventional audio compact cassette.

As in the conventional audio magnetic tape cassette, the digital audio magnetic tape cassette should be suitable for use outdoors and it should be possible to transport the cassette without its storage casing.

A variety of digital audio type magnetic tape cassettes have been proposed in the art. Such a magnetic tape cassette generally includes a guard panel which can be swung upwardly, similar to the above-described video tape cassette, and a slide guard which can be slid back and forth on the bottom of the cassette thereby to close the lower part of the opening formed in the front part of the cassette.

However, conventional digital audio magnetic tape cassettes of this type are relatively intricate in construction and more difficult to assemble than video cassettes due to their smaller size and weight. These problems are exacerbated due to the presence of components such as the slide guard, a hub locking member, and an urging member for operating these components.

Furthermore, in view of the foregoing, it is essential that the digital audio magnetic tape cassette provide more positive protection and dustproofing of the magnetic tape than the conventional video tape cassette. Also there has been a strong demand for the provision of a slide guard for the cassette which can more smoothly slide.

SUMMARY OF THE INVENTION

In view of the foregoing, an object of the invention is to provide a magnetic tape cassette which is easy to assemble and which is designed so that the slide guard and the hub locking member thereof operate positively.

Another object of the invention is to provide a magnetic tape cassette which provides more positive protection and dustproofing of the magnetic tape.

The foregoing object and other objects of the invention have been achieved by the provision of a magnetic tape cassette which incorporates a pair of hubs on which a magnetic tape is wound and a locking member for locking the hubs, and which has an opening through which the magnetic tape can be pulled out of the cassette, the cassette comprising a swingable guard panel adapted to close the front part of the opening, and a slidable slide guard adapted to close the lower part of the opening, in which, according to the invention, the locking member has locking parts which are engaged with annular parts formed on the hub to thus prevent rotation of the hubs, the locking member being slidable forwardly and backwardly of the cassette, the slide guard is in the form of a plate which is slidable on the outer surface of the bottom of the cassette case forwardly and backwardly of the cassette, and a compound spring is provided which comprises a fulcrum part locked to a boss formed in the cassette case and two arms extending from a fulcrum part, one of the two arms urging the locking member towards the rear end of the cassette and the other arm urging the slide guard towards the front end of the cassette.

The foregoing object and other objects of the invention have further been achieved by the provision of a magnetic tape cassette which incorporates a pair of hubs on which a magnetic tape is wound and which has an opening through which the magnetic tape can be pulled out of the cassette, the cassette comprising a swingable guard panel adapted to close the front part of the opening, and a slidable slide guard adapted to close the lower part of the opening, in which, according to the invention, the slide guard is slidable on the outer surface of the bottom of a cassette case and is urged towards the front end of the cassette by a spring engaged with an engaging protrusion formed beside the front edge of the slide guard, the engaging protrusion comprising an upper end piece extending towards the rear end of the cassette and a base part having a tapered surface inclined from a spring receiving part towards the rear end of the cassette.

DESCRIPTION OF THE PREFERRED EMBODIMENTS

The invention will be described with reference to preferred embodiments shown in the accompanying drawings.

Figure 1:
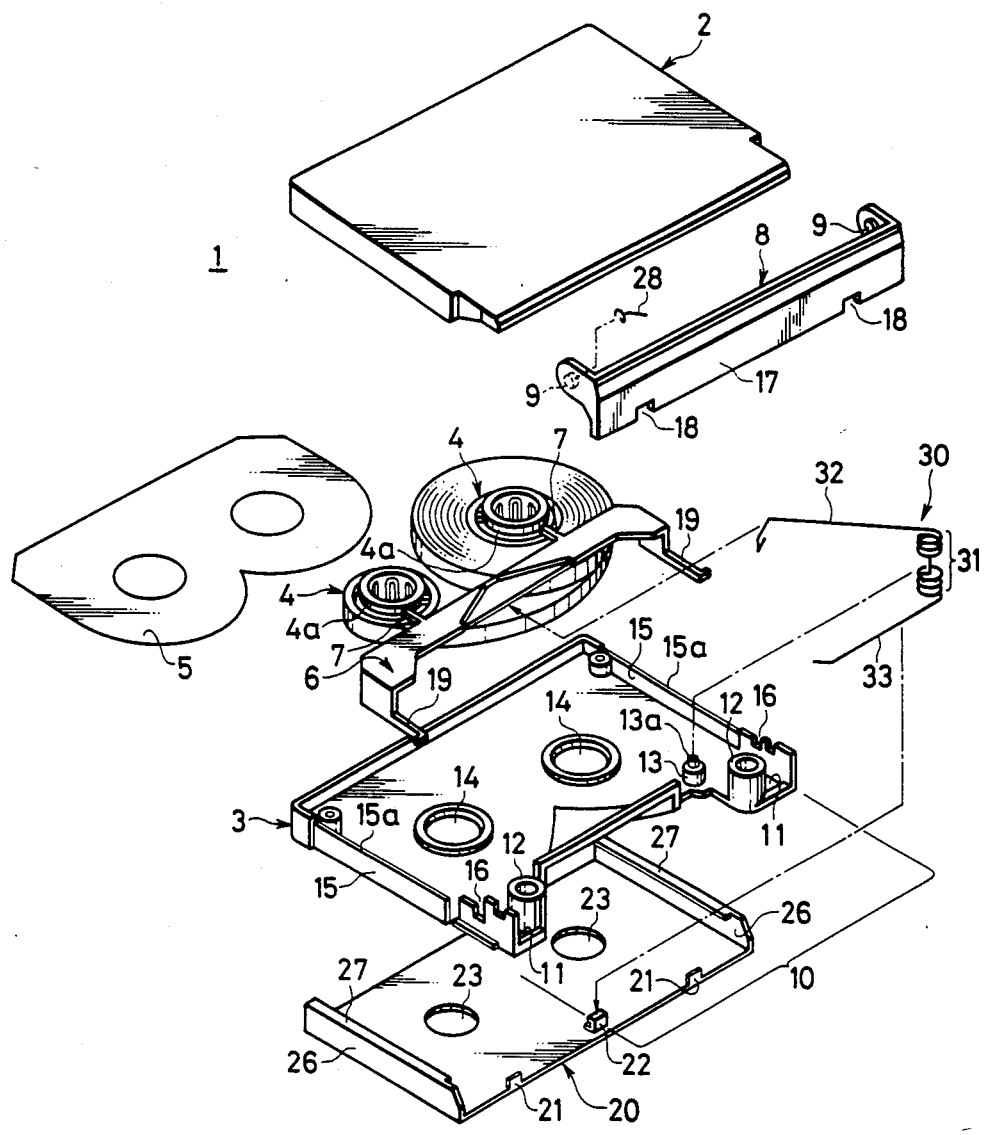
FIG. 1 is an exploded perspective view showing a preferred embodiment of a magnetic tape cassette of the invention.

FIG. 1 shows a magnetic tape cassette 1 constructed according to the invention the same in size or smaller than a conventional compact cassette employed for audio devices. The cassette 1 includes a cassette case composed of upper and lower half cases 2 and 3. The cassette case incorporates a pair of hubs 4 on which a magnetic tape T is wound, friction sheets 5 for allowing the hubs 4 to smoothly rotate, and a locking member 6 for preventing unwanted rotation of the hubs 4. The cassette 1 further includes a guard panel 8 used to close the front part of an opening 10 formed in the front part of the cassette case, and a slide guard 20 used to close the lower part of the opening 10. The hubs 4 have annular parts 4a which protrude coaxially with tape winding walls in such a manner that they can be engaged with the locking member 6.

The guard panel 8 is substantially U shaped in horizontal section, similar to a conventional video tape cassette, and its right and left end pieces have respective rotary supporting shafts 9 which protrude towards each other. The rotary supporting shafts 9 of the guard panel 8 are rotatably engaged with holes 16 formed when the upper and lower half cases 2 and 3 are joined together, or holes (not shown) formed in one of the upper and lower half cases 2 and 3. The guard panel 8 is urged by a spring 28 to close the opening 10.

The guard panel 8 has two cuts 18 formed in the end portions of its front wall 17 located along the lower edge of the front wall 17. The two cuts 18 are employed for effecting correct loading of the magnetic tape cassette 1 into the recording and reproducing device. That is, only when erroneous-insertion preventing protrusions of a "bucket" (a cassette receiving part provided in the cassette loading section of the recording and reproducing device) meet the cuts 18 can the magnetic tape cassette be correctly loaded into the recording and reproducing device.

Similar to the conventional video tape cassette, the lower half case 3 has a pair of reel shaft inserting holes 14 in correspondence to the hubs 4, and has tape drawing openings 11 at both ends of the aforementioned opening 10 so that the magnetic tape T can be drawn out of the cassette for recording and reproducing. A boss 13 having a slot 13a at the top is formed on the lower half case located near one of the tape drawing openings 11 (the right opening 11 in FIG. 1). A spring 30, fitted on the boss 13, urges the locking member 6 and the slide guard in predetermined directions. The cassette bottom is formed so that its part between the tape drawing opening 11 is recessed towards the rear end of the cassette. In other words, it is designed so that, when the magnetic tape cassette 1 is loaded into the recording and reproducing device, the tape drawing member of the latter can move into the cassette from below.

The spring 30 has upper and lower arms 32 and 33, and a fulcrum coil part 31 in the form of double coils formed by winding the base parts of the upper and lower arms. The end portion of the upper arm 32 connected to the upper coil is bent in a U shape in the direction of thickness of the cassette, and is engaged with the locking member 6 to urge the latter towards the rear end of the cassette. The end portion of the lower arm 32 connected to the lower coil is engaged with an engaging protrusion 22 on the slide guard 20 to urge the latter towards the front end of the cassette.

Steps 15a are formed on the upper edges of the side walls 15 of the lower half case are configured so that, when the cassette is assembled, slots are formed through which the overhangs 27 of the slide guard 20 can move inside the cassette.

The slide guard 20 is substantially in the form of a plate. Through-holes 23 are formed in the slide guide 20 in alignment with the reel shaft inserting holes 14, and the aforementioned engaging protrusion 22 and protrusion 21 received by the cuts 18 are formed on the inner surface of the slide guard 20 confronting the outer surface of the lower half case 3. Furthermore, the slide guard 20 is bent at right angles to provide side pieces 26 at both ends which extend along the cassette case side walls 15. The upper edges of the side pieces 26 extend slightly inwardly of the cassette case to form the aforementioned overhangs 27.

The front part of the upper half case 2 is designed so that, similar to a conventional video tape cassette, when it is combined with the lower half case 3, the aforementioned tape drawing openings 11 are formed. An arrangement (not shown) for regulating the rotational positions of the hubs 4 is provided on the inner surface of the upper half case 2.

The magnetic tape cassette 1 is assembled as follows: First, the slide guard 20 is mounted on the outer surface of the lower half case 3. In this case, the overhangs 27 are caused to move inside the cassette, passing over the steps 15a. Thereafter, the hubs 4 on which the magnetic tape T has been wound are placed on the friction sheet 5 on the inner surface of the lower half case 3 in such a manner that they are in alignment with respective ones of the reel shaft inserting holes 14. Then, the magnetic tape T is partially pulled out of the cassette through the tape drawing openings 11 and is laid over right and left tape guides 12. Under this condition, the other friction sheet 5 is placed over the hubs 4, and then the locking member 6 is placed on the friction sheet 5.

Thereafter, the fulcrum coil part 31 of the spring 30 is fitted onto the boss 13. The end portion of the upper arm 32 is engaged with the locking member 6, while the end portion of the lower arm 33 is engaged with the engaging protrusion 22. When the upper half case 2 is combined with the lower half case 3, the rotary supporting shafts 9 of the guard panel 8 are rotatably engaged with the holes 16, and the guard panel 8 itself is urged by the guard panel spring 28 to close the opening 10. After the upper half case 2 is placed on the lower half case 3 as described above, the cases 2 and 3 are joined tightly with screws or the like.

When the magnetic tape cassette 1 is in storage (not in use), the guard panel 8 and the slide guard 20 close the opening 10, and the annular parts 4a of the hubs 4 are abutted against the respective engaging parts 7 of the locking member 6 so that unwanted rotation of the hubs 4 is prevented.

The upper and lower half cases 2 and 3, the guard panel 8, and the locking member 6 may be made of a plastic resin such as polyacetal resin, ABS resin or PS resin, as a conventional cassette. It is preferable that the slide guard be made of plastic resin due to considerations of manufacturing cost, but it may be made of a metal such as stainless steel if desired.

The magnetic tape T may be a ferromagnetic iron oxide or chromium dioxide tape; however, it is preferable to employ a magnetic tape such as a metal tape or vacuum deposited tape, which is more suitable for high density recording and reproducing operations.

Figure 2:
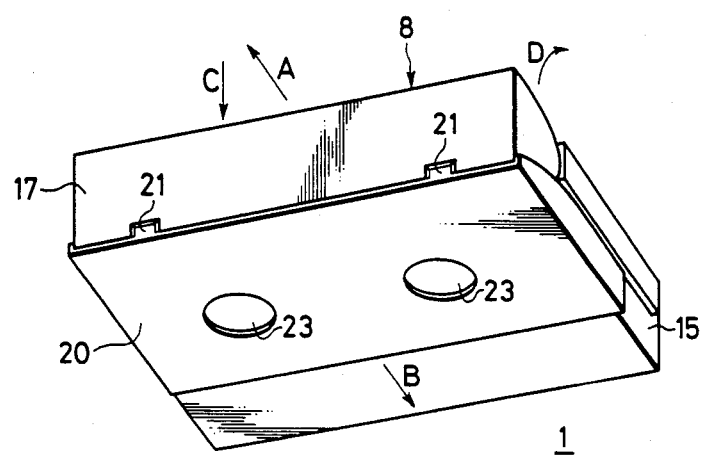
FIG. 2 is a perspective view showing the magnetic tape cassette of FIG. 1 in the assembled state.

In loading the magnetic tape cassette in the recording and reproducing device, the various parts of the cassette function as follows:

In order to load the magnetic tape cassette 1 into the cassette inserting section of the recording and reproducing device, the cassette 1 is inserted with its opening 10 held forwardly (in the direction of the arrow A in FIG. 2). In the inserting operation, the protrusions 21 of the slide guard 20 are abutted against the erroneous-insertion preventing protrusions in the cassette inserting section so that the slide guard 20 is slid towards the rear end of the cassette (in the direction of the arrow B). As a result, the lower part of the opening 10 is opened, while the through-holes 23 are aligned with the respective reel shaft inserting holes 14 so as to be ready to receive the hub driving reel shafts.

Thereafter, the magnetic tape cassette 1 is moved in the direction perpendicular to the direction of insertion, namely, downwardly (in the direction of the arrow C). In this operation, the lower edge of the guard panel 8 is abutted against guard panel opening device provided at the inner part of the cassette inserting section so that the guard panel is swung upwardly (in the direction of the arrow D) with the rotary supporting shafts 9 acting as a rotational axis.

As the guard panel 8 is opened, the right and left end pieces of the guard panel 8 engage the end portions of the right and left extended pieces 19 of the locking member 6 to slide the latter towards the front end of the cassette. As a result, the hubs 4 are disengaged from the locking parts 7 of the locking member 6 so that the hubs can be turned.

When the loading of the magnetic tape cassette 1 has been accomplished by inserting it and by moving it downwardly and the opening 10 has been completely opened by sliding the slide guard 20 and by swinging the guard panel 8 as described above, the annular parts 4a of the hubs 4 are disengaged from the engaging parts 7 of the locking member 6. As a result, the magnetic tape T can be partially pulled out of the cassette while the hubs 4 can be turned. Thus, the cassette is ready for a recording or reproducing operation.

In unloading the magnetic tape cassette 1 from the magnetic tape recording and reproducing device, the magnetic tape cassette 1 is moved in the opposite direction. First, the guard panel 8 is disengaged from the guard panel opening device so that it closes the front part of the opening 10 with the aid of the guard panel spring 28. As the magnetic tape cassette 1 is pulled out, the slide guard 20 is disengaged from the erroneousinsertion preventing protrusions and slid towards the front end of the cassette with the aid of the lower arm 33 of the spring 30. As a result, the opening 10 is completely closed.

As the guard panel 8 swings to close the opening 10, the right and left end pieces of the guard panel 8 are disengaged from the ends of the extended pieces 19 of the locking member 6. As a result, the locking member 6 is slid towards the rear end of the cassette by the elastic force of the upper arm 32 of the spring 30 so that the locking parts 7 are engaged with the annular parts 4a of the hubs 4, thus locking the latter. As the slid guard 20 slides so as to close the lpwer part of the opening 10, the reel shaft inserting holes 14, being displaced from the through-holes 23, are closed.

Since the middle part of the fulcrum coil part 31 of the spring 30 is fitted in the slot 13a formed in the boss 13, the elastic forces of the upper and lower arms 32 and 33 are not affected by each other. Therefore, the elastic forces can be established suitably and maintained stable.

In the above-described embodiment, the fulcrum coil part 31 of the compound spring 30 is in the form of double coils arranged vertically. However, the invention is not limited thereto or thereby. For instance, the fulcrum coil part 31 may be in the form of a coil which can be fitted on the boss 13.

Figure 3:
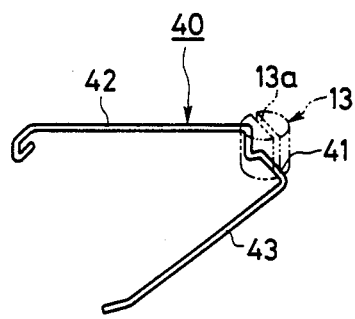
FIG. 3 is a perspective view showing essential components of a modification of the magnetic tape cassette of FIGS. 1 and 2.

The above-described compound spring 30 may be modified as shown in FIG. 3.

In a compound spring 40 shown in FIG. 3, its fulcrum part 41 is not in the form of a coil. Instead, the fulcrum part 41 is bent so that it is inserted into the slot 13a of the boss formed on the lower half case 3, and the end portion of the upper arm 42 is engaged with the locking member 6 while the lower arm 43 is engaged with the engaging protrusion 22 on the slide guard 20.

In the above-described embodiment, the slide guard 20 is slid towards the rear end of the cassette by causing the erroneous-insertion preventing protrusions to engage with the right and left protrusions 21 formed on the front edge of the slide guard. However, it should be noted that the invention is not limited thereto or thereby. For instance, the cassette may be modified by forming the engaging protrusion 22 engaging the lower arm 33 of the spring 30 on the front edge of the slide guard, and forming a cut for receiving the engaging protrusion 22 in the guard panel 8.

As is apparent from the above description, when the magnetic tape cassette of the invention is in storage (not in use), the opening 10 is maintained completely closed by the guard panel 8 and the slide guard 20, and the reel shaft inserting holes 14 are also closed by the slide guard 20. Therefore, the magnetic tape T in the cassette is sufficiently protected from damage and dust. That is, the cassette is considerably effective in maintaining the recording and reproducing characteristics of the magnetic tape.

Furthermore, according to the invention, the locking member 6 and the slide guard 20 are spring biased by only one compound spring 30, which can be readily mounted in the cassette. This remarkably improves the assembly efficiency of the cassette.

Further embodiments of the invention will be described with reference to FIGS. 4 through 7. In these drawings, reference numerals used commonly in FIG. 1 through 3 identify like components.

Figure 4:
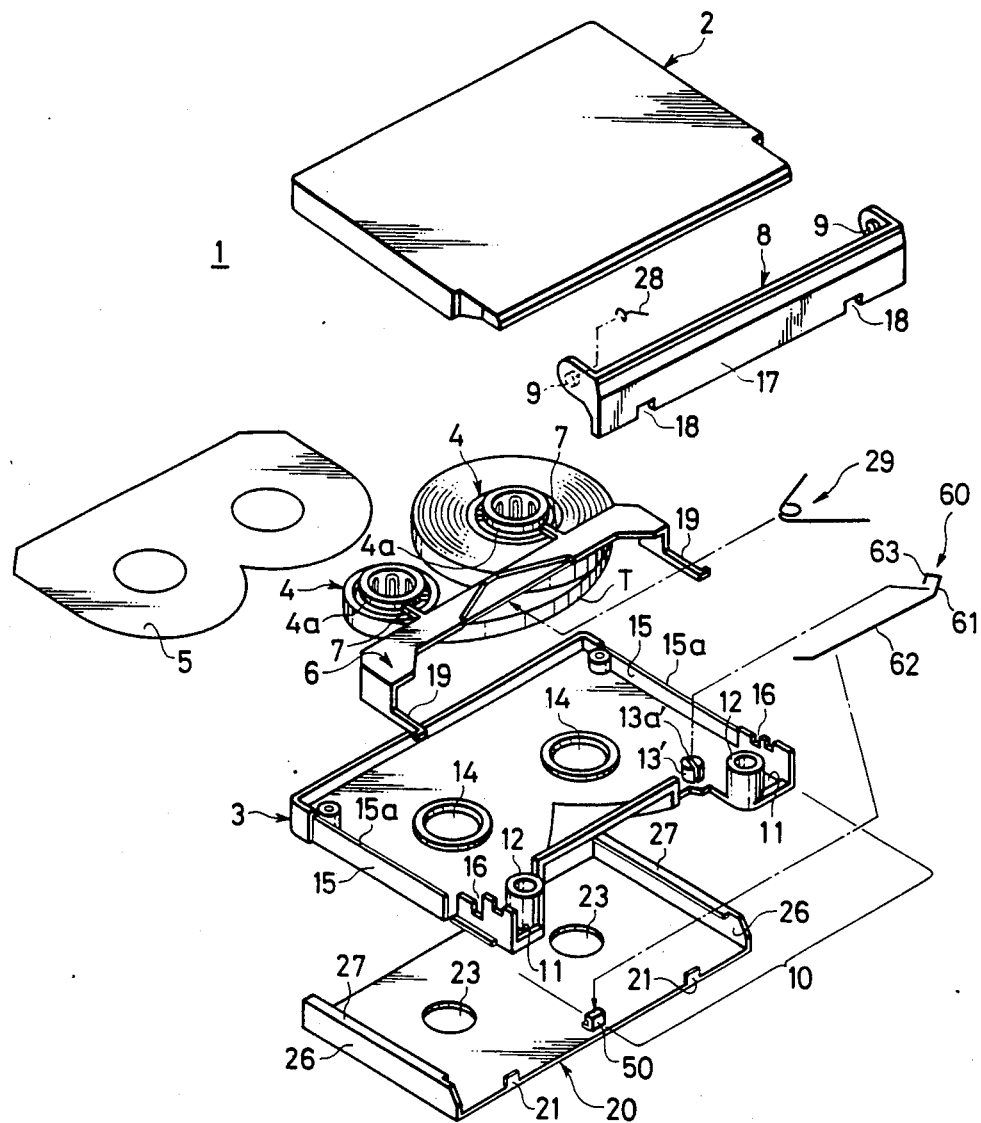
FIG. 4 is an exploded perspective view showing various components of another cassette of the invention.

Similar to the video cassette of FIG. 1 through 3, the cassette of the embodiment of FIG. 4 includes a lower half case 3 having a pair of reel shaft inserting holes 14 in correspondence to the hubs 4. Also, tape drawing openings 11 are formed at both ends of the opening 10 through which the magnetic tape T can be drawn out of the cassette. A boss 13' having a slot 13a' at the top is formed on the lower half case located near one of the tape drawing openings 11 (the right opening 11 in FIG. 4). A bar-shaped spring 60, mounted on the boss 13', urges the slide guard 20 in a predetermined direction.

The spring 60 has an arm part 62, a fulcrum part 61, and a hook part 63. The spring 60 is mounted on the lower half case 3 with the fulcrum part 61 inserted into the slot 13a' of the boss 13'. The end portion of the arm part 62 is engaged with an engaging protrusion 50 formed on the slide guard 20. Therefore, the slide guard 20 is urged towards the front end of the cassette.

Figure 5:
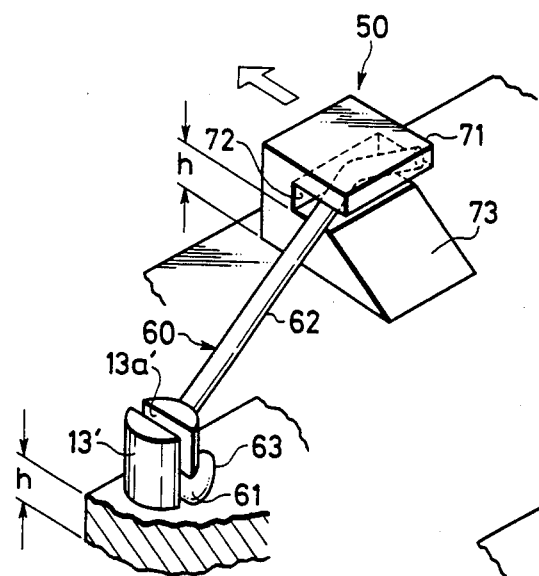
FIG. 5 is an enlarged perspective view showing essential components of the cassette of FIG. 4.

As shown in FIG. 5, the upper portion of the engaging protrusion 50 is formed into an upper end piece 71 which extends towards the rear end of the cassette, and the lower portion has a tapered surface 73, whereby the arm part 62 of the spring 50 is received by a spring receiving recess 72 formed in the engaging protrusion 50. The height of the spring receiving recess 72 from the slide guard 20 is equal to the wall thickness h of the lower half 3. That is, the elastic force of the spring 60 acts only in the horizontal direction.

The front part of the upper half case 2 is designed so that, as in a conventional video tape cassette, when it is combined with the lower half case 3, the aforementioned tape drawing openings 11 are formed. An arrangement (not shown) for regulating the rotational positions of the hubs 4 is provided on the inner surface of the upper half case 2.

The magnetic tape cassette 1 is assembled as follows: First, the slide guard 20 is mounted on the outer surface of the lower half case 3. In this case, the overhangs 27 are caused to move inside the cassette passing over the steps 15a. Thereafter, the hubs 4 on which the magnetic tape T has been wound are placed on the friction sheet 5 previously placed on the inner surface of the lower half case 3 with the hubs in alignment with respective ones of the reel shaft inserting holes 14. Then, the magnetic tape T is partially pulled out of the cassette through the tape drawing openings 11 and is laid over right and left tape guides 12. Under this condition, the other friction sheet 5 is placed over the hubs 4, and the locking member 6 is placed on the friction sheet 5. Then, the locking member spring 29 is installed, and the upper half case 2 is placed on the lower half case.

When the spring 60 is mounted with the fulcrum part 61 pushed or dropped into the slot 13a' of the boss 13' as described above, the end portion of the arm part 62 of the spring 60 is engaged with the engaging protrusion 50. In this operation, since the engaging protrusion 50 has the tapered surface 73, the end portion of the arm part 62 is readily and positively received by the spring receiving recess 62. When the upper half case 2 is combined with the lower half case 3, the rotary supporting shafts 9 of the guard panel 8 are rotatably engaged with respective ones of the holes 16, and the guard panel 8 is urged by the guard panel spring 28 to close the opening 10. After the upper half case 2 is placed on the lower half case 3 as described above, the cases 2 and 3 are joined tightly with screws or the like.

The loading and unloading operations of the cassette of this embodiment are similar to those of the cassette of FIGS. 1 through 3.

In unloading the magnetic tape cassette from the magnetic tape recording and reproducing device, the magnetic tape is moved in the directions opposite to the directions in which the magnetic tape has been moved during the loading operation. First, the guard panel 8 is disengaged from the guard panel opening device so that it closes the front part of the opening 10 with the aid of the guard panel spring 28. As the magnetic tape cassette 1 is extracted, the slide guard 20 is disengaged from the erroneous-insertion preventing protrusions and slid towards the front end of the cassette by the elastic force of the spring 60. As a result, the opening 10 is completely closed.

As the guard panel 8 swings to close the opening 10, the right and left end pieces of the guard panel 8 are disengaged from the ends of the extended pieces 19 of the locking member 6. Hence, the locking member 6 is slid towards the rear end of the cassette by the elastic force of the locking member spring 29 so that the locking parts 7 of the locking member 6 are engaged with the annular parts 4a of the hubs 4, thus locking the latter. On the other hand, as the slide guard 20 slides to close the lower part of the opening 10, the reel shaft inserting holes 14, being displaced from the through-holes 23, are closed.

The direction of extension of the arm part of the spring 30 is determined by how the fulcrum part 31 is fitted in the slot 13a' of the boss 13', and therefore its elastic force can be readily set to a suitable value.

In the above-described embodiment, the spring receiving recess 72 of the engaging protrusion 50 is substantially U shaped in vertical section; however, the invention is not limited thereto or thereby. For instance, the engaging protrusion may be modified as shown in FIGS. 6 and 7.

Figure 6:
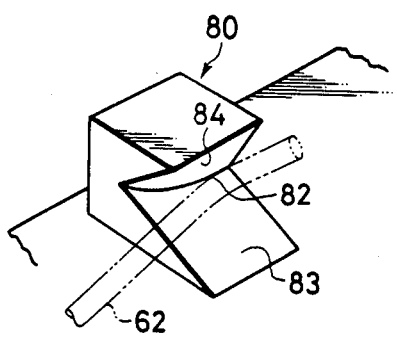
FIGS. 6 and 7 are perspective views showing essential components of modifications of the cassette of FIGS. 4 and 5.

In an engaging protrusion 80 shown in FIG. 6, the part for receiving the spring 60 is substantially L shaped in vertical section, and the boundary line between the upper and lower tapered surfaces 84 and 83 is curved towards the rear end of the cassette. Therefore, a spring receiving part 82 for receiving the spring 60 is in point contact with the spring 60 at a predetermined position.

Figure 7:
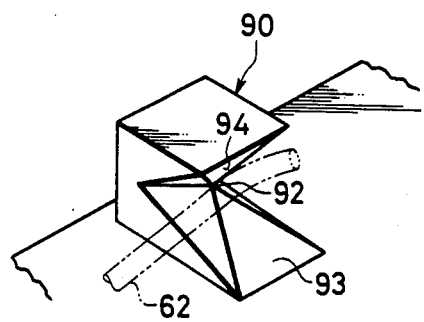

Similar to the engaging protrusion 80 of FIG. 6, an engaging protrusion 90 shown in FIG. 7 is also substantially L shaped in vertical section. The spring receiving part 92 of the engaging protrusion 90 is in the form of a point. That is, three tapered surfaces including a lower tapered surface 93, and three tapered surfaces including the upper tapered surfaces 94 extend from the spring receiving part 92.

Each of the spring receiving parts 82 and 92 is at the distance h from the bottom of the slide guard, and each of the engaging protrusions 80 and 90 is designed so as to provide point contact with the spring 60. Therefore, when the slide guard 20 is slid back and forth, the spring 60 is stable both in energization force and in energization direction.

In the above-described embodiments, the arm part 62 and the fulcrum part 61 of the spring 60 are formed by suitably bending an elastic wire. However, it should be noted that the invention is not limited to the above-illustrated configuration of the spring. Specifically, the fulcrum part may be in the form of a coil fitted on the boss 13'.

In the above-described embodiment, the slide guard 20 is slid towards the rear end of the cassette by causing the erroneous-insertion preventing protrusions to engage with the right and left protrusions 21 formed on the front edge of the slide guard. However, it should be noted that the invention is not limited to the above-illustrated configuration of the spring. Specifically, the fulcrum part may be in the form of a coil fitted on the boss 13'.

In the above-described embodiment, the slide guard 20 is slid towards the rear end of the cassette by causing the erroneous-insertion preventing protrusions to engage with the right and left protrusions 21 formed on the front edge of the slide guard. However, the invention is not so limited. That is, the cassette may be modified by forming the engaging protrusion 50 for engaging the arm part 62 of the spring 60 on the front edge of the slide guard, and forming a cut for receiving the engaging protrusion 22 in the guard panel 8.

As is apparent from the above description, when the magnetic tape cassette of the invention is in storage, the opening 10 is maintained completely closed by the guard panel 8 and the slide guard 20, and the reel shaft inserting holes 14 are also closed by the slide guard 20. Therefore, the magnetic tape T in the cassette is sufficiently protected from damage and dust. That is, the cassette is considerably effective in maintaining the recording the reproducing characteristic of the magnetic tape.

Furthermore, according to the invention, because the engaging protrusions 50, 80 and 90 have the tapered surfaces 73, 83 and 93, respectively, during installation of the spring 60, the end portion of the spring 60 can be readily positioned and engaged with the spring receiving part 72, 82 or 92. As described above, the height of the spring receiving part from the bottom of the slide guard is equal to the wall thickness of the cassette. Therefore, the slide guard 20 is protected from forces acting vertically of the cassette, which makes it possible to move the slide guard 20 smoothly and to readily determine the force of energization of the spring 60.

It has been stated that the technical concept of the invention is applied to a digital audio magnetic tape cassette of the same size or smaller than a conventional audio compact cassette. However, it should be noted that the invention is not limited thereto or thereby. That is, the technical concept of the invention is applicable to conventional video tape cassettes and other magnetic tape cassettes.

We claim:

1. In a magnetic tape cassette including; a cassette case having a bottom, a pair of hubs on which a magnetic tape is wound, said hubs having annular parts, a locking member for locking said hubs, means defining an opening within said cassette case having a front part and a lower part through which said magnetic tape can be extracted from said cassette, a swingable guard panel mounted on said case and adapted to close said front part of said opening, and a slidable slide guard mounted on said case and adapted to close said lower part of said opening, the improvement wherein: said locking member comprises locking parts engaged with said annular parts formed on said hubs to prevent rotation of said hubs, said locking member being slidable forwardly and backwardly of said cassette case; said slide guard being in the form of a plate which is slidable on the outer surface of said bottom of said cassette case forwardly and backwardly of said cassette; a boss projecting upwardly from said case bottom, and a compound spring comprising a fulcrum part locked to said boss and two integral arms extending from said fulcrum part, one of said two arms contacting an edge of said locking member and urging said locking member towards a rear end of said cassette and the other arm contacting said slide guard and urging said slide guard towards a front end of said cassette.

2. The magnetic tape cassette of claim 1, wherein said boss has a transverse slot therein, said compound spring fulcrum part comprises two vertically arranged coils, a junction portion between said coils of said spring and said junction portion being received in said slot formed in said boss.

3. The magnetic tape cassette of claim 1, wherein said compound spring fulcrum part is fitted around said boss.

4. The magnetic tape cassette of claim 1, wherein said boss includes a transverse slot, said slide guard includes an engaging protrusion, the fulcrum part of said spring is bent in a generally V shape and received in said transverse slot formed in said boss, an end portion of the upper arm of said spring is engaged with said locking member and the lower arm of said spring is engaged with said engaging protrusion of said slide guard.

5. In a magnetic tape cassette including; a cassette case, having a bottom, a pair of hubs on which a magnetic tape is wound, means defining an opening within said case having a front part and a lower part through which said magnetic tape can be extracted from said cassette, a swingable guard panel mounted on said case and and adapted to close said front part of said opening, and a slidable slide guard adapted to close said lower part of said opening, the improvement wherein: said slide guard has a front edge and an engaging protrusion at said front edge, said slide guard is slidably mounted on an outer surface of said bottom of said cassette case and is urged towards a front end of said cassette by a spring engaged with said engaging protrusion adjacent said front edge of said slide guard, said engaging protrusion comprises an upper end piece having an end directed towards a rear end of said cassette, a spring receiving part and a base part having a tapered surface inclined from said spring receiving part towards said rear end of said cassette.

6. The magnetic tape cassette of claim 5, wherein a boundary line between said base part and said spring receiving part of said engaging protrusion is generally L shaped in vertical cross section and is curved towards said rear end of said cassette.

7. The magnetic tape cassette of claim 5, wherein said base part has three tapered surfaces defining a contact point of a spring receiving part of said engaging protrusion.

8. The magnetic tape cassette of claim 5, wherein said case includes an upstanding boss having a transverse slot, said spring is in the form of a bar having an arm part, a fulcrum part, and a hook part, said hook part being engaged in said transverse slot formed in said boss, said arm part engaging said engaging protrusion, and said fulcrum part joining said hook part and said arm part.

9. The magnetic tape cassette of claim 5, wherein a height of a spring receiving part of said engaging protrusion from said bottom of said slide guard is equal to a wall thickness of said cassette.

* * * * *